United States Patent [19]
Visser

[11] 3,917,088
[45] Nov. 4, 1975

[54] LOAD HANDLING APPARATUS
[75] Inventor: Peter J. Visser, Niles, Mich.
[73] Assignee: Clark Equipment Company, Buchanan, Mich.
[22] Filed: Nov. 23, 1973
[21] Appl. No.: 418,350

Related U.S. Application Data
[62] Division of Ser. No. 267,747, June 30, 1972, Pat. No. 3,827,743.

[52] U.S. Cl. ............ 214/130 R; 212/8 R; 212/144; 214/38 CA; 214/77 R
[51] Int. Cl.² .................................... B65G 67/02
[58] Field of Search ........ 214/77 R, 80, 130 R, 145, 214/38 CA, 38 C; 212/8 R, 8 B, 46 R, 144

[56] References Cited
UNITED STATES PATENTS

| | | | |
|---|---|---|---|
| 2,689,656 | 9/1954 | Przybylski ........................... | 212/144 |
| 3,243,066 | 3/1966 | Gardner et al. ................... | 214/145 X |
| 3,705,656 | 12/1972 | Hunger et al. ...................... | 214/145 |
| 3,726,421 | 4/1973 | Goldhofer ......................... | 214/77 R |

FOREIGN PATENTS OR APPLICATIONS
1,548,863   10/1968   France .............................. 214/77 R Primary Examiner—Robert J. Spar
Assistant Examiner—Leslie J. Paperner
Attorney, Agent, or Firm—Kenneth C. Witt

[57] ABSTRACT

A load handling apparatus, which may form a part of a load transfer machine for handling semi-trailers, cargo containers and other large loads. The load handling apparatus includes a mechanism which is readily collapsible by remote control to dimensions sufficiently small that the load transfer machine may be mounted on a semi-trailer or other vehicle for movement over public highways. At the same time, the load handling apparatus is readily erectable, also by remote control, so that it may be quickly prepared for the handling of large loads.

4 Claims, 11 Drawing Figures

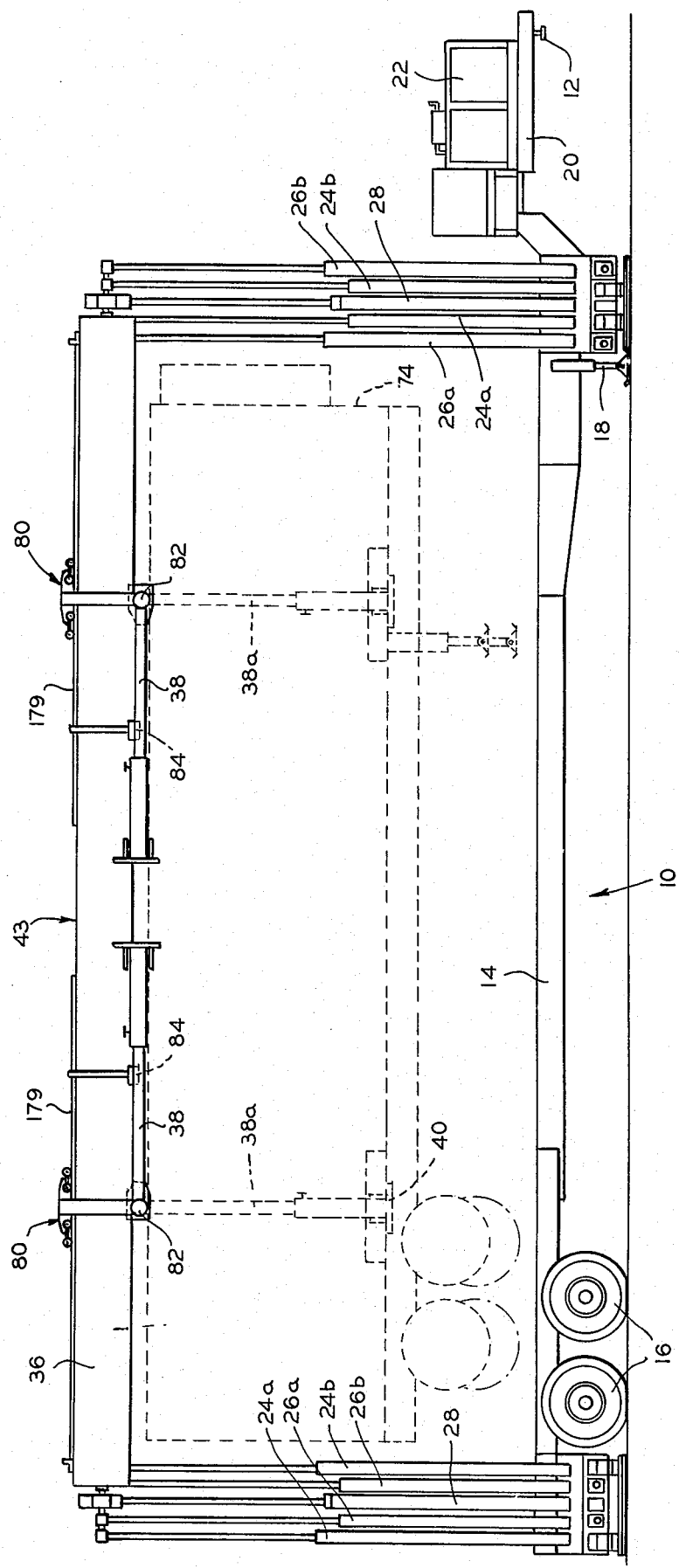

LOAD HANDLING APPARATUS

CROSS REFERENCES

This is a division of copending U.S. patent application Ser. No. 267,747, filed June 30, 1972 now U.S. Pat. No. 3,827,743.

The load handling apparatus of the present invention may be utilized advantageously with the load transfer machine which is the subject of U.S. Pat. No. 3,718,221, dated Feb. 27, 1973, however, the present invention is not limited to use with that particular load transfer machine.

BACKGROUND OF THE INVENTION

1. Field of the Invention

This invention relates to load handling devices and mechanisms which may be incorporated in load transfer machines for loading and unloading trailers, semi-trailers and containers onto or off of railroad cars, for handling housing modules, and other large loads. This invention is particularly useful in load transfer machines which are mobile or portable so that they may be moved from place to place as needed.

2. Description of the Prior Art

Many of the prior art machines for handling large loads of the types mentioned are themselves so large that they are restricted to operation in a single area, if indeed they are movable at all; and many are of the stationary type. For example, gantry type machines are frequently used in the transfer of loads onto and off of railroad cars, and such gantry machines are large enough that they can straddle the railroad car and a highway vehicle beside the track, and at the same time are high enough to be able to lift the load and transfer it between two locations.

Machines have been disclosed previously which attempt to provide in various ways —including the retraction and collapsing of portions in some cases— load transfer machines which can be made movable so that it is possible to move them readily from one location to another. The object of the present invention is to provide a load handling apparatus for a machine of the type mentioned which enables the machine to be mounted on a semi-trailer or other conveyance, and when it is so mounted, enables it to be readily collapsed to a configuration which permits it to be within the allowable limits for transport over public highways and which also enables it to be readily erected again for operation at the loading site.

SUMMARY OF THE INVENTION

In carrying out this invention in one preferred form, a load handling apparatus is provided which includes a plurality of extendible and retractable supports projecting upwardly from the base of a load handling machine and pivotally connected thereto. A collapsible mechanism comprising a boom arm is pivotally connected at the upper ends of the supports and is horizontally disposed in the collapsed position, with an auxiliary boom pivotally connected at one end to the boom arm and extending downwardly in the collapsed position. A load handling device which is pivotally mounted at the other end of the auxiliary boom arm abuts one of the extendible and retractable supports in the collapsed position.

BRIEF DESCRIPTION OF THE DRAWING

FIG. 4 is a side elevation of the load transfer machine with the load handling device still partially in the collapsed condition, with another condition indicated in dashed lines;

Figure 3:
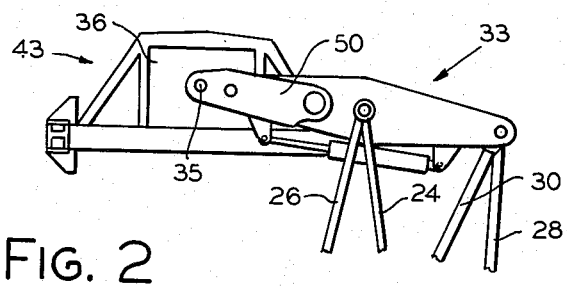
FIG. 3 is similar to FIG. 2 with the supporting actuators extended to elevate the load handling device portion.

All of the figures of the drawing are partially schematic.

DESCRIPTION OF THE PREFERRED EMBODIMENT

Figure 1:
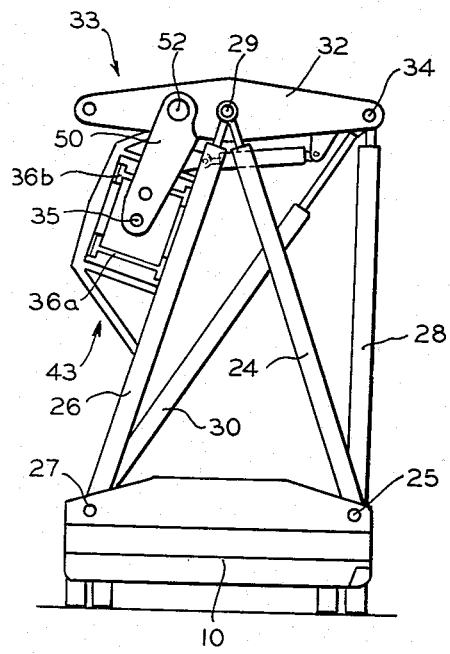
FIG. 1 is an end elevation of a load transfer machine embodying the load handling apparatus, including a load handling device and the associated collapsible mechanism of the present invention, in the collapsed condition.

Referring first to FIG. 1 of the drawing, some of the basic parts of a typical load transfer machine are shown schematically. In FIG. 1 and other figures, the base of the transfer machine is shown as a semi-trailer indicated by the numeral 10 which can be readily moved from one location to another by coupling a suitable tractor to the kingpin indicated at 12 (in FIG. 4).

Referring to FIG. 4, the semi-trailer illustrated has a suitable intermediate structural portion indicated at 14, wheels 16 at the rear and landing gear 18 at the front to support the front end of the semi-trailer after the tractor vehicle which moved it is detached. The semi-trailer illustrated also has a goose neck portion 20 upon which is mounted in the enclosure 22 an engine which provides the power to operate the various actuators to be described. In this typical machine the engine drives a hydraulic pump (not shown) which supplies pressurized fluid for operating the various actuators. It will be appreciated also from the subsequent description that the portion of the semi-trailer which supports the load handling apparatus and mechanism of the present invention is generally rectangular in configuration, that is, the various supports for the load handling apparatus are connected adjacent the four corners in a rectangular arrangement.

Referring to FIG. 1, the numerals 24 and 26 indicate respectively a pair of extensible and retractable linear actuators which provide a portion of the support for the load handling apparatus of the present invention and which are hereinafter referred to as the main supports. As illustrated, the main supports are expansible chamber hydraulic devices. Main supports 24 and 26 are pivoted on the base 10 at their lower ends about axes 25 and 27 as indicated. Actually, both supports 24 and 26 are double and include two actuators each in the embodiment described and illustrated herein and this may be seen by reference to FIG. 4 in which the two actuators which comprise main support 24 are indicated by the numerals 24a and 24b, while the two actuators which comprise main support 26 are indicated at 26a and 26b. Moreover, it will be observed that the arrangement just described is duplicated at the opposite end of the base 10 except that 26a and 26b are outside of 24a and 24b instead of vice versa. This imparts additional longitudinal strain resistance to the complete machine. In order to simplify the description, the main supports will be referred to herein as if they were single instead of double.

Still referring to FIGS. 1 and 4, there is also a pair of auxiliary supports or guides indicated respectively by the numerals 28 and 30. The lower end of support 28 is pivoted about the same axis as main support 24 in the construction illustrated, while the lower end of support 30 is pivoted about the same axis as main support 26. The auxiliary supports are duplicated at the opposite end of the base 10. Auxiliary supports 28 and 30 are shown herein as piston and cylinder type expansible chamber hydraulic devices, but it will be appreciated that other equivalent supports or guides may be used if desired.

The upper ends of main support 24 and 26 at both ends of the load transfer mechanism are pivotally connected at intermediate locations 29 to a transverse boom arm 32 which is horizontally disposed in the collapsed position shown in FIG. 1 and forms a portion of a collapsible boom arm mechanism indicated generally by the numeral 33. The upper ends of auxiliary supports 28 and 30 are pivotally connected about a common axis 34 adjacent one end of the boom arm, and this applies at both ends of the load transfer machine. The other ends of the boom arms in the embodiment shown support between them a load handling device 43 (see FIGS. 4 and other figures) pivotable about a pivot axis 35 (see FIG. 2) in the erected position. Load handling device 43 comprises a longitudinal beam structure 36 (see FIG. 4) which supports lift arms 38, the structure and operation of which are described further hereinafter.

Figure 2:
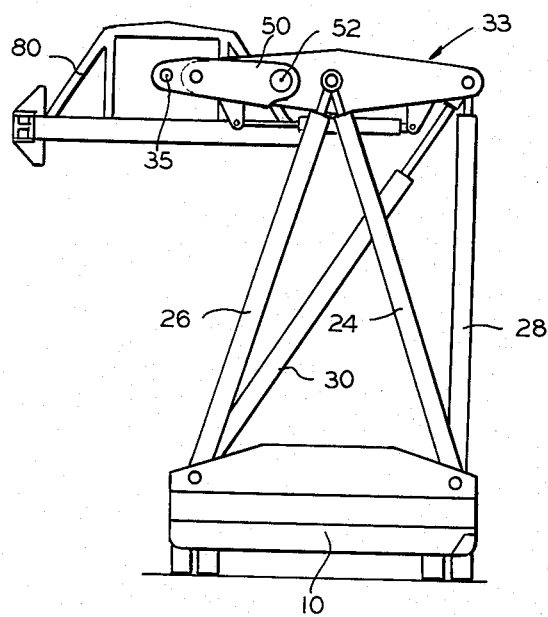
FIG. 2 is a similar view except showing the partially erected condition.

FIG. 2 of the drawing is a view showing the load handling apparatus and mechanism partially erected to prepare for a handling operation in that the collapsible mechanism 33 has been moved from the position of FIG. 1 to the horizontally disposed position of FIG. 2. This is accomplished by pivoting an auxiliary boom arm 50 about a pivot axis 52, it being understood that in the embodiment shown there is an auxiliary boom arm 50 at each end of the load transfer machine. In FIG. 1, the auxiliary boom arm 50 is in a downwardly extending position in which the main members 36a and 36b (which are embodied in beam 36) of the load handling apparatus 43 abut and rest against main support 26 at one end and support 24 at the other end, and in FIG. 2 it has been pivoted to a horizontal erected position and secured to main boom arm 32 in order to provide in effect an extension of the main boom arm.

Figure 5:
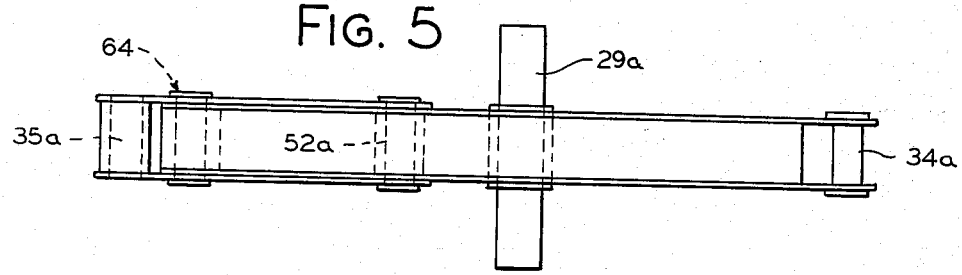
FIG. 5 is a top plan view showing a main and auxiliary boom arm and related parts.
Figure 6:
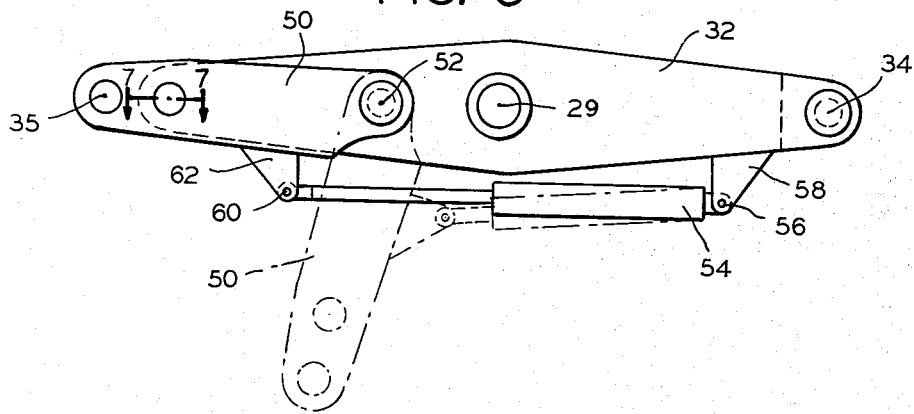
FIG. 6 is a side elevation showing the main and auxiliary boom arm and related parts.

FIGS. 5, 6, 7 and 7A show more details of the main and auxiliary boom arms, including the manner in which they are secured together in the operating position. In FIG. 6, the auxiliary boom arm 50 is shown in dashed lines in a depending position which corresponds to FIG. 1 and in solid lines in the operating position which corresponds to FIG. 2. Auxiliary boom arm 50 is pivoted between the said two positions by means of an actuator 54 which may be of the expansible chamber, piston and cylinder hydraulic type, the actuator being pivotally connected at 56 to a bracket 58 on the main boom and also pivotally connected to the auxiliary boom arm at 60 by means of a bracket 62. In FIG. 5, the various pivot shafts, pins and bearing surfaces are identified by the same numerals as the pivot axes in FIG. 6 with the addition of the letter "a" in each case to indicate the respective shaft, pin or bearing surface. FIG. 5 also indicates the location of the latch mechanism 64 which secures the auxiliary boom arm to the main boom arm in the operating position.

Figure 7:
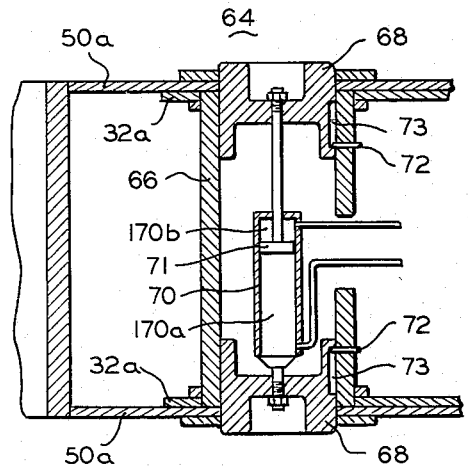
FIG. 7 is a fragmentary sectional view along the line 7—7 of FIG. 6 showing the details of the latch for securing an auxiliary boom arm to its main boom arm.
Figure 7A:
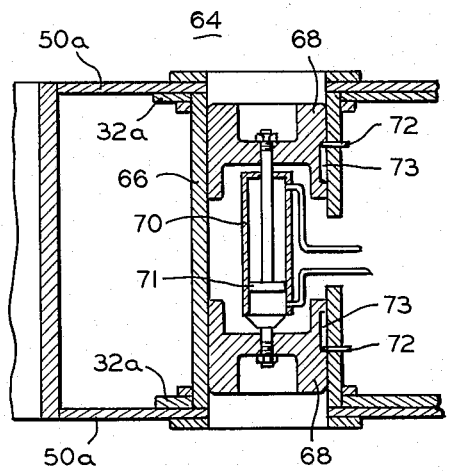
FIG. 7A is the same as FIG. 7 except showing the latch in the retracted position.

A typical latch 64 which is suitable for this purpose is shown in more detail in FIG. 7 which is a fragmentary view in section along the line 7—7 of FIG. 6. In FIG. 7, the main boom 32 is shown as comprised of a pair of spaced-apart side plate portions designated 32a and having a cylindrical member 66 secured to and extending between the two side plates. Within cylinder 66 are located a pair of latching members 68 which in the latched position shown in FIG. 7 project through aligned openings in the side plates 32a of the main boom and the side plates 50a of the auxiliary boom 50 and thus secure the main and auxiliary booms securely together. The members 68 are extended and retracted by means of a piston and cylinder type hydraulic actuator 70 which is remotely operated by the operator of the load transfer machine. FIG. 7A shows the latching member 68 in the retracted and unlatched position, the inward movement of the members 68 being limited by the pins 72 which project through the cylinder 66 into suitable recesses 73 in the members 68.

It will be appreciated that the latch mechanism 64 is latched by applying hydraulic pressure in chamber 170a below piston 71 to extend the actuator to the latched position indicated in FIG. 7 in which the detent members 68 latch the main and auxiliary booms together. To unlatch the mechanism, the actuator 70 is retracted by applying hydraulic pressure in chamber 170b on the rod side of piston 71 to contract the actuator to the position shown in FIG. 7A and thus retract members 68 and unlatch auxiliary boom arm 50 from main boom arm 32.

Figure 9:
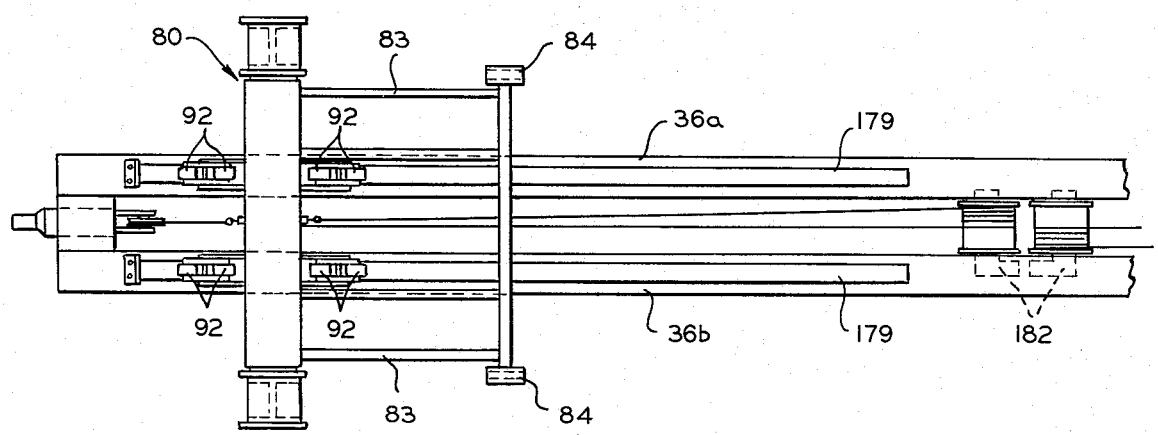
FIG. 9 is a top plan view showing a portion of the load handling device.
Figure 10:
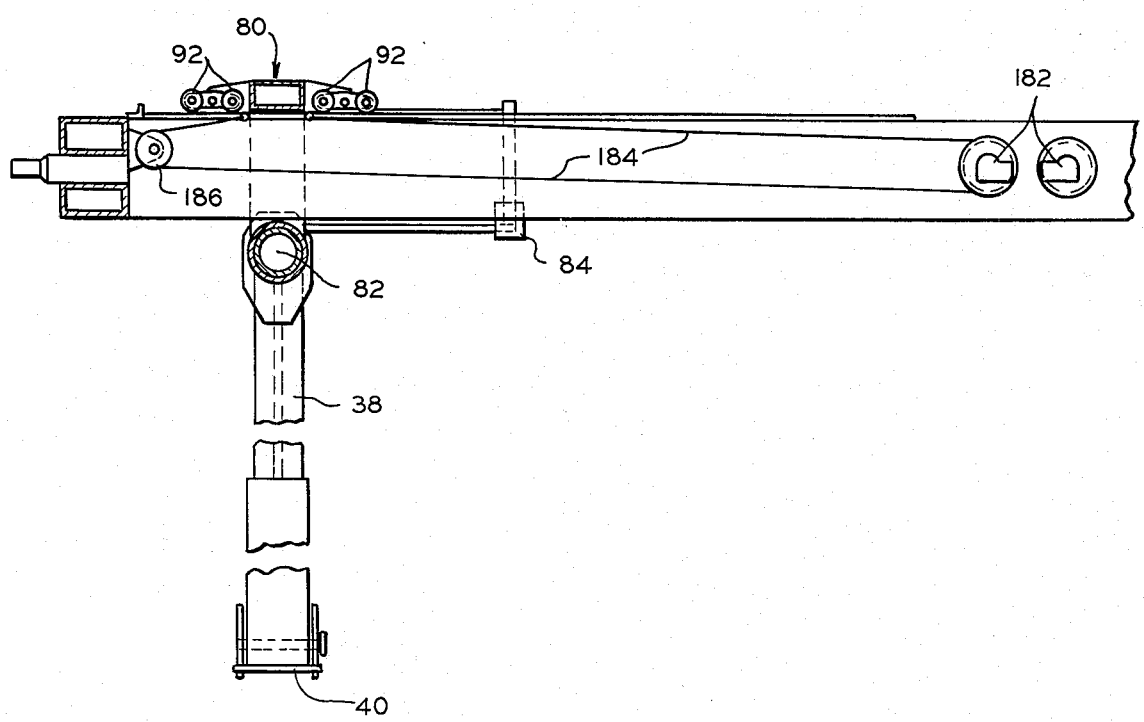
FIG. 10 is a side elevational view showing the same portion as FIG. 9 of the load handling device.

As shown in FIG. 4, load handling device 43 includes carriages or support structures 80 which are adjustable longitudinally along the main beam 36 and this is illustrated in more detail by the partially schematic top plan and side elevational views of FIGS. 9 and 10, it being understood that the carriage 80 at the opposite end of the machine is an allochiral image of the structure to be described. Main beam structure 36 is indicated in FIG. 9 as comprising two I-beams which are designated respectively 36a and 36b. The carriage 80 is supported on rollers 92 which operate on tracks 179 on the upper surfaces of I-beams 36a and 36b, and the carriage 80 is moved back and forth longitudinally along the beam 36 by means of a known mechanism including a hydraulic motor at 182 which operates suitable cables 184, one of which is trained over sheave 186, to provide forward and reverse movement of the carriage 80, powered by motor 182 in a known manner.

Figure 8:
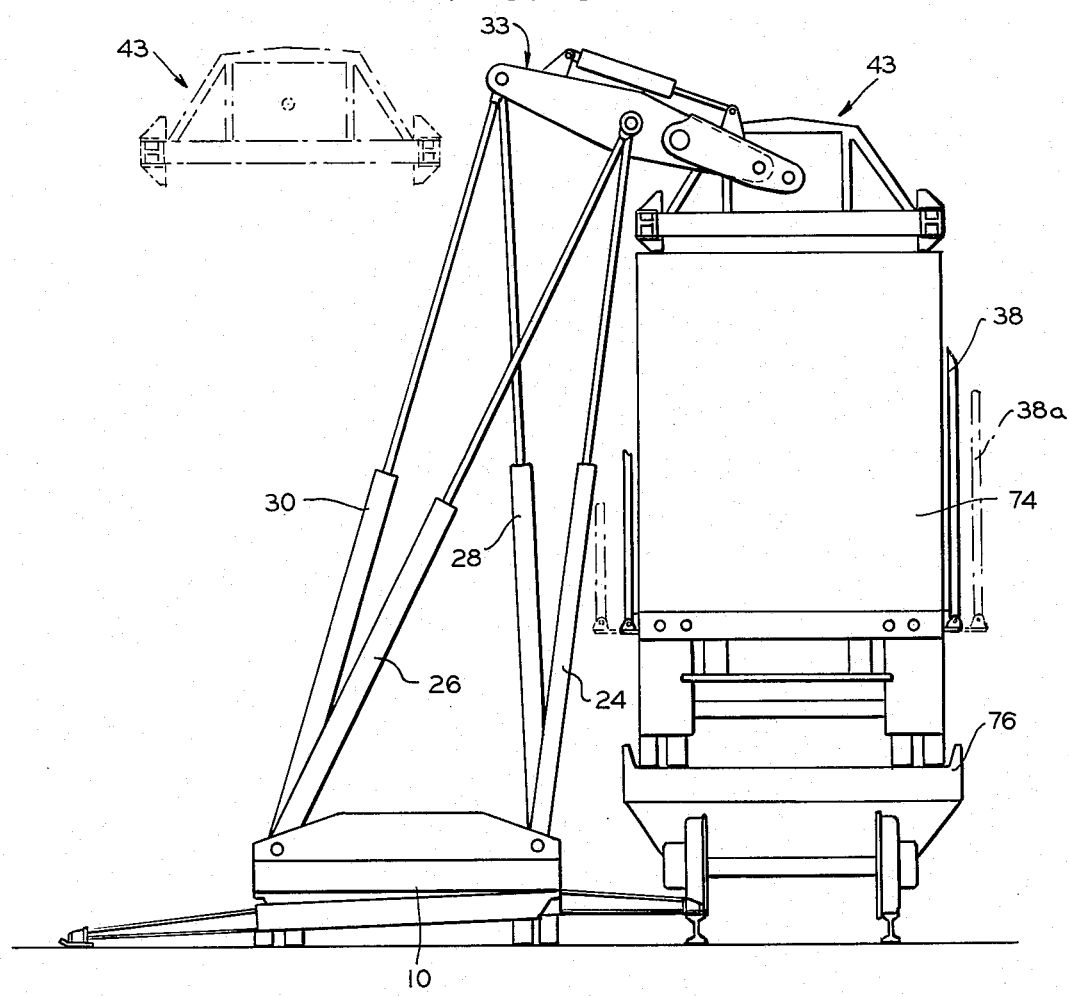
FIG. 8 is an end elevation of the load transfer machine with the load handling device in position over a semi-trailer on a railroad flatcar.

As shown in FIG. 8, the load handling device 43 has been moved from the position of FIG. 3 (which is indicated in dashed lines of FIG. 8) to a position over a load such as a semi-trailer 74 on a railroad car 76. This is accomplished by suitable manipulation of the main supports 24 and 26 and auxiliary supports or guides 28 and 30.

The device 43, in addition to the carriages 80, includes for each carriage 80, a pair of lift arms 38. Each of the lift arms 38 is pivotable from the solid line position shown in FIG. 4 which represents the collapsed or transport position. In such collapsed position, the arms 38 are engaged in and secured to brackets 84 which are connected to and form a part of the carriages or support structures 80 by means of intermediate frame members 83 (see FIG. 9).

In operation, after the carriages 80 have been adjusted to the desired longitudinal positions to fit load 74, the arms 38 are then pivoted downwardly to depending positions shown in dashed lines at 38a in FIG. 4. See also FIG. 10. Thereafter the arms 38 are moved inwardly to engage the lift shoes 40 at the ends thereof beneath the load in order to lift it.

If more details are desired as to the construction and operation of the arms 38 or other parts of the load handling device 43, reference should be had to the said U.S. Pat. No. 3,827,743.

It will be appreciated that by the use of the present load handling apparatus in conjunction with the load handling apparatus of the copending patent referred to hereinbefore that it is possible readily to transfer a load from one side of the load transfer machine to the other, for example, from the position of FIG. 8 from which it is lifted, over to the other side of the base 10 in the manner shown in U.S. Pat. No. 3,718,221. Likewise, a loading or unloading operation can be accomplished in the same manner in the opposite direction.

In order to prepare the present load handling apparatus and the collapsible mechanism forming a portion thereof for transfer to another location, it is necessary only to follow the reverse of the procedure which has been outlined herein. First, the arms 38 are moved outwardly away from the load and then pivoted upwardly after which they are moved inwardly and then upwardly again and latched to the brackets 84. Then, the latches 64 are operated by remote control to unlatch them in the manner described hereinbefore and cause the auxiliary boom arms to pivot downwardly with respect to the main boom arms to restore the machine to the condition illustrated in FIG. 1, it being understood that it may be necessary also to operate the main supports 24 and 26 and auxiliary supports 28 to 30.

It will be understood that in the claims it is necessary in order to specify adequately the scope of the present invention to state that certain parts are located in particular positions in certain circumstances, such as the main boom arms being in a horizontally disposed position in the collapsed condition of the load handling machine even though such boom arms occupy other positions during the operation of the load handling machine. It should be further understood that it is not intended to limit the scope of the claims by the use of such terminology.

While I have disclosed and described herein a preferred embodiment of my invention, it will be understood that modifications may be made, and I intend to cover by the appended claims all such modifications which fall within the true spirit and scope of my invention.

I claim:

1. A load handling machine adaptable for mounting on a vehicle comprising an elongated base, a plurality of extendible and retractable supports projecting upwardly adjacent each end of the base and pivotally connected thereto, a pair of main boom arms pivotally connected in parallel relation at the tops of the said extendible support members adjacent the ends of the base respectively and horizontally disposed in a collapsed position, a pair of auxiliary boom arms pivotally connected at one end of each auxiliary boom arm to one of the said main boom arms respectively and extending downwardly in the collapsed position, a pair of actuators connected respectively between each said main boom arm and its said auxiliary boom arm for pivoting the latter to an aligned position adjacent the former in which the auxiliary boom arm in effect forms an extension of the main boom arm, a pair of latches for releasably securing the said main boom arms and the corresponding auxiliary boom arms together in the said aligned position, a load handling device pivotally connected to and suspended between the other ends of the said auxiliary boom arms in the said aligned position and adapted for transferring a load laterally over said base, at least on of said extendible and retractable supports at each end of the base located inboard of its respective main boom arm, the said load handling device abutting one of the said inboard extendible and retractable supports adjacent each end of the base to provide support in the collapsed position.

2. A load handling machine as in claim 1 in which the surface of the said load handling device which abuts certain supports is planar and is parallel to the abutting supports when in contact therewith.

3. A load handling machine as specified in claim 1 in which each of the said latches includes a latch operating mechanism which is located internally of the respective main boom arm.

4. A load handling machine as specified in claim 3 which includes a pair of hydraulic devices for operating the said latch operating mechanisms respectively by remote control.

* * * * *